United States Patent [19]
Ehrenhardt et al.

[11] Patent Number: 6,019,702
[45] Date of Patent: Feb. 1, 2000

[54] AUTOMATIC ELEVATED IDLE SPEED CONTROL AND METHOD OF OPERATING SAME

[75] Inventors: Kevin D. Ehrenhardt, Eureka; James W. Landes, East Peoria; Prasad V. Parupalli, Peoria, all of Ill.

[73] Assignee: Caterpillar Inc., Peoria, Ill.

[21] Appl. No.: 09/079,022

[22] Filed: May 14, 1998

[51] Int. Cl.$^7$ ........................................... B60L 1/00
[52] U.S. Cl. ......................... 477/97; 477/107; 74/15.86
[58] Field of Search ..................... 477/97, 107; 701/50; 74/15.8, 15.86

[56] References Cited

U.S. PATENT DOCUMENTS

| | | | |
|---|---|---|---|
| 4,715,012 | 12/1987 | Mueller | 701/50 |
| 5,480,364 | 1/1996 | Hilbert et al. | 477/107 |
| 5,542,306 | 8/1996 | Fernandez | 74/15.86 |
| 5,563,547 | 10/1996 | Blanchard et al. | 123/319 X |
| 5,611,751 | 3/1997 | Ehrenhardt et al. | 477/73 |
| 5,765,650 | 6/1998 | Checkel | 74/15.6 X |

*Primary Examiner*—Khoi Q. Ta
*Attorney, Agent, or Firm*—R. Carl Wilbur

[57] ABSTRACT

An automatic elevated idle speed control is disclosed for use with an internal combustion engine on a vehicle. The control includes an electronic controller connected with an engine speed determining means, and a sensor that determines the power requirements of a PTO device and produces a signal. The control automatically varies an engine speed command based on the signal.

6 Claims, 4 Drawing Sheets

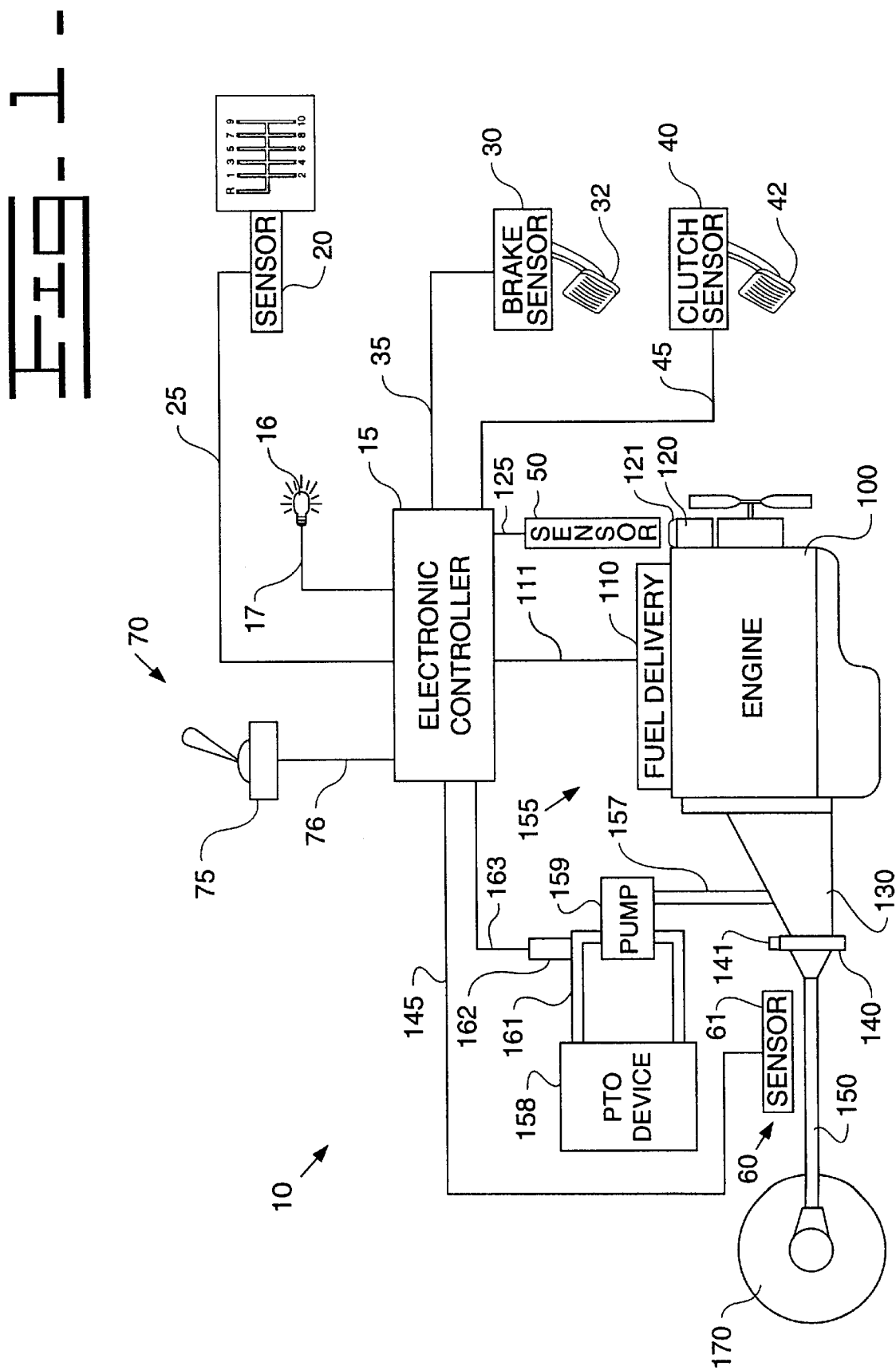

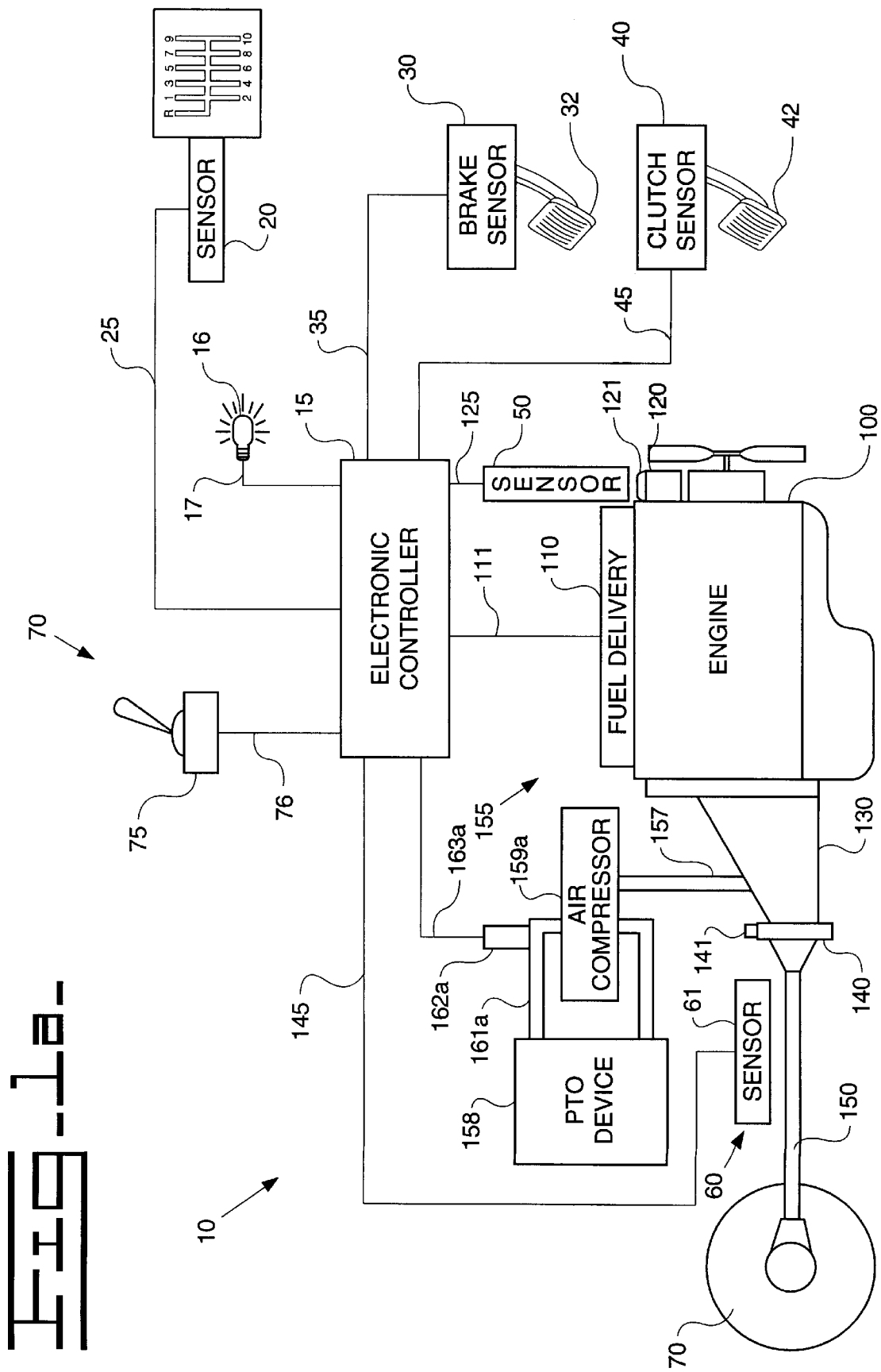

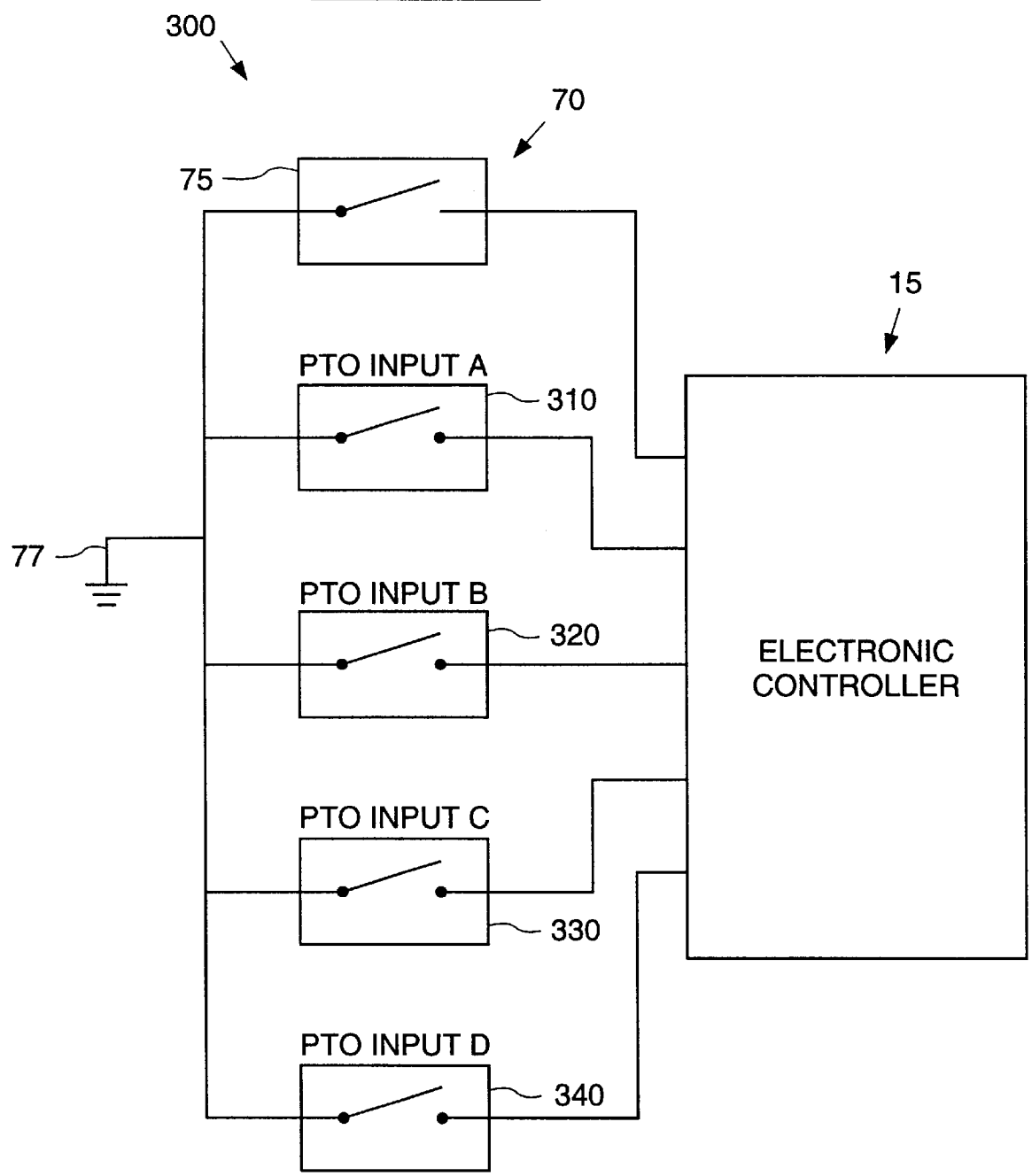

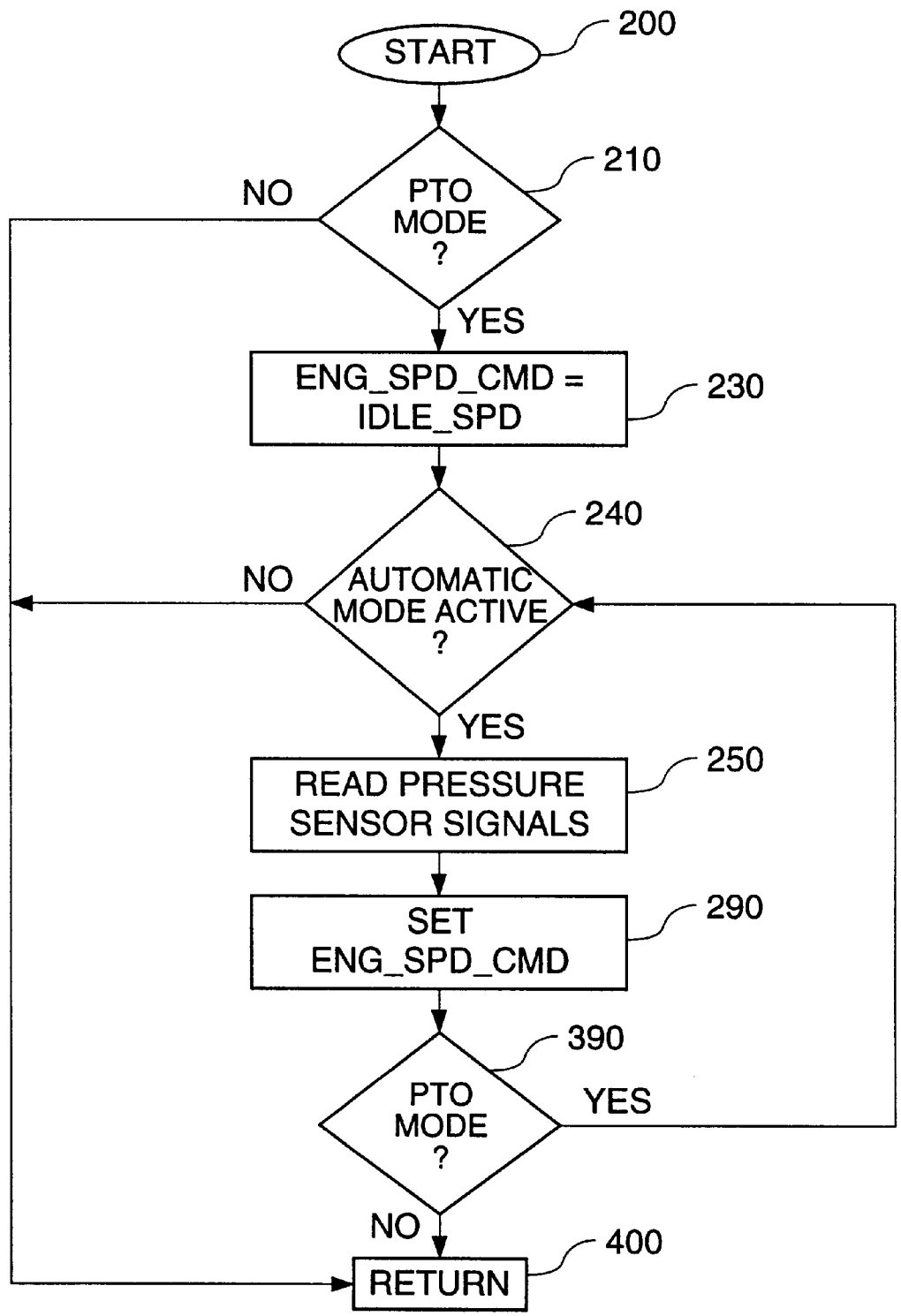

AUTOMATIC ELEVATED IDLE SPEED CONTROL AND METHOD OF OPERATING SAME

TECHNICAL FIELD OF THE INVENTION

The present invention generally relates to electronic engine controls, and more specifically, relates to an automatic elevated idle speed control.

BACKGROUND OF THE INVENTION

On highway trucks often have a power-take-off ("PTO") or other devices which allow the truck engine to power devices connected to the truck. The PTO generally includes a rotating shaft extending from the transmission or engine. The device to be powered is then connected to the PTO shaft. As the PTO shaft rotates, power is transmitted to the device. One such device is a hydraulic pump used in connection with a garbage truck. In that application, the PTO shaft is connected to the hydraulic pump which in turn provides hydraulic pressure to the hydraulic cylinders that compact the garbage. Other vehicles that have a PTO include utility vehicles, school buses and fire trucks.

In these applications, the truck engine provides power to both the PTO and the drive train of the truck. In cases where the truck is traveling on the road, the engine speed is generally high enough to provide sufficient power for both the PTO and the transmission. However, when the truck is parked and idling, the engine may not produce sufficient power to drive the external device connected to the PTO. In those instances, the operator has sometimes been required to press the accelerator pedal to elevate the idle speed to cause the engine to produce more power. When using the throttle, however, it is possible to generate too much power which could damage the external device. Manually maintaining a desired and acceptable elevated idle speed is inefficient and prevents the operator from performing other tasks when the truck is stopped and idling.

There are known prior art devices that have to some extent addressed this problem. One such device is disclosed in U.S. Pat. No. 5,480,364, in which an apparatus for selectively commanding an elevated high idle mode is disclosed. That apparatus preferably includes a toggle switch or other means for causing the engine to enter a high idle mode. High idle mode is normally selectable when the brake pedal is not pressed, the clutch pedal is not pressed, the vehicle is traveling below a certain predetermined speed, and the gear selector is in neutral. In a preferred embodiment of that invention, if the engine speed is below a default value when the toggle switch is activated, then the idle speed will correspond to the default valve. If the engine speed exceeds a maximum high idle value when the toggle switch is activated, then the idle speed will correspond to the maximum high idle value. If the engine speed is greater than the default value but less than the maximum high idle value when the toggle switch is activated, then the idle speed will correspond to the speed of the engine at the time when the toggle switch is activated.

Other known PTO control systems that are implemented on an electronically controlled engine permit the end user or other qualified personnel to program a number of predetermined desired PTO engine speeds. For example, the end use may involve a garbage truck that requires the engine to run at several different speeds to most efficiently load and compact garbage. In that case the end user may program the engine to run at the predetermined speeds of idle, 1200 and 1600 RPM. Then when the vehicle operator causes the controller to run in a PTO mode and toggles the PTO switch the engine speed command will generally increase to the next higher engine speed, except when the desired engine speed is 1600 RPM, in which case toggling the switch will cause the engine to return to the lowest preset speed. Thus, if the engine is idling at its normal idle speed and the PTO device requires more power, the operator can simply toggle the PTO switch to cause the engine speed to increase to the next programmed step, in this case 1200 RPM. If the operator then toggles the PTO switch again, then the engine speed will increase to the next programmed step, in this example 1600 RPM. Another toggling of the PTO switch will cause engine speed to return to idle. In this way, the operator can use the PTO switch to toggle between the preprogrammed PTO engine speeds.

The above system overcomes some disadvantages associated with the prior art, but still requires manual intervention by the vehicle operator to modify the engine speed. It would be preferable to have an apparatus that could cause the engine to automatically vary the engine speed based on the operational mode of, or power required by, the PTO device.

SUMMARY OF THE INVENTION

The present invention includes a sensor that produces a signal indicative of the power requirements of a PTO device. An engine controller receives the signal and responsively modifies the engine speed command.

Other aspects and advantages of the present invention will become apparent upon reading the detailed description in connection with the drawings and appended claims.

BRIEF DESCRIPTION OF THE DRAWINGS

FIG. 1 is a block diagram of a preferred embodiment of the automatic elevated idle control of the present invention;

FIG. 1a is a block diagram of a preferred embodiment of the automatic elevated idle control of the present invention including an air compressor;

FIG. 2 is a block diagram of a PTO mode switch and PTO input pressure switches connected to an electronic controller in a preferred embodiment of the present invention; and FIG. 3 is a flow chart of a preferred embodiment of the software control implemented in an electronic controller of the present invention.

DETAILED DESCRIPTION OF A PREFERRED EMBODIMENT

A preferred embodiment of the best mode of practicing the present invention is described herein. The present invention is not limited to this single embodiment. On the contrary, the present invention encompasses all alternative designs and equivalents that fall within the scope of the present invention as defined by the appended claims.

Referring first to FIG. 1, a preferred embodiment of the automatic engine speed control 10 used in connection with an engine 100 driving a PTO device 158 is shown. The automatic engine speed control 10 is used in connection with an internal combustion engine 100 having fuel delivery means 110 associated therewith. Associated with the engine 100 is a flywheel rotatably connected to a transmission 130 to transmit power from the engine 100 to a drive wheel 170 of the vehicle. The transmission is also connected to a tone wheel 140.

The elevated idle speed control 10 includes an electronic controller 15, which is electrically connected to a gear selection sensor 20 via electrical connector 25, to a brake pedal sensor 30 via electrical connector 35, and to a clutch pedal sensor 40 via electrical connector 45. In a preferred embodiment, these sensors include two position switches. However, other embodiments may use other forms of sensors without deviating from the scope of the present invention as defined by the appended claims. A PTO mode indicator lamp 16 is also connected to the electronic controller 15 via an electrical connector 17.

The gear selector sensor 20 is associated with a gear shift or gear selector lever (not shown) and produces a neutral signal when the gear selector lever is in a neutral position and the transmission is therefore in neutral. The electronic controller 15 inputs the neutral signal from electrical connector 25. In some applications of the present invention, however, a gear selector sensor might not be utilized.

The brake pedal sensor 30 is associated with the brake pedal 32 and produces a brake pedal engaged signal when the truck operator has depressed the brake pedal 32. The electronic controller 15 inputs the brake pedal engaged signal from electrical connector 35.

The clutch pedal sensor 40 is associated with the clutch pedal 42 and produces a clutch pedal engaged signal when the truck operator has depressed the clutch pedal 42. In a preferred embodiment, the electronic controller 15 inputs the clutch pedal engaged signal from electrical connector 45. However, it should be recognized that other embodiments, particularly those applications involving automatic transmissions where a clutch pedal is not used, may not have a clutch pedal sensor 40. Those embodiments may nevertheless fall within the scope of the present invention as defined by the appended claims.

Also connected to the electronic controller 15 is an engine speed sensor 50, a vehicle speed sensor 60 and a PTO mode selector 70. In a preferred embodiment, the engine speed sensor 50 includes a timing gear 120 associated with a camshaft (not shown) of the engine 100. The timing gear 120 preferably includes teeth 121 or other features that are capable of being sensed as the timing gear 120 rotates. The engine speed sensor 50 is preferably installed in proximity to the timing gear 120 to permit the sensor 50 to sense the teeth 121 as the timing gear 120 rotates. The engine speed sensor 50 produces a signal that is a function of the rotational velocity of the timing gear 120, which in turn is a function of the engine speed. The electronic controller 15 inputs the engine speed signal from an electrical connector 125. Such engine speed sensors 50 are well known in the art.

The vehicle speed sensor 60 preferably includes a tone wheel 140 that rotates at a speed that is a function of the speed of the rotating drive shaft 150. The tone wheel 140 preferably includes teeth 141 or other features such as slots that are capable of being sensed when the tone wheel 140 rotates. A vehicle speed sensor 61 is located proximate to the tone wheel 140 such that the vehicle speed sensor can sense the passing of the teeth 141 or other features as the tone wheel 140 rotates. The vehicle speed sensor 140 produces a vehicle speed signal that is a function of the rotational velocity of the tone wheel 140, which in turn is a function of the speed of the drive shaft and the vehicle. Such sensors are well known in the art. The electronic controller 15 inputs the vehicle speed signal over an electrical connector 145.

In a preferred embodiment, a PTO output 155 is associated with the engine. As those skilled in the art will readily recognize there are many different configurations for a PTO output, any one of which is suitable for use with the present invention. In FIG. 1, the PTO output 155 includes a gearbox associated with the transmission 130 and a PTO output shaft 157 that provides power to a PTO device 158. In other applications, however, a PTO shaft 157 may come directly out of the engine 100, or be associated with the engine flywheel through a separate gearbox. Such applications nevertheless fall within the scope of the present invention as defined by the appended claims.

As shown in FIG. 1, the PTO output shaft 157 is connected to a hydraulic pump 159 which provides pressure to a hydraulic circuit 161 which in turn powers the PTO device 158. Such hydraulic circuits can be readily and easily constructed by those skilled in the art. Although a preferred embodiment includes a hydraulic pump 159 and a hydraulic circuit 161, as shown in FIG. 1, other embodiments may include an air compressor 159a and a compressed air circuit 161a or a direct mechanical linkage between the PTO output shaft 157 and the PTO device 158. As shown in FIG. 1a, in an embodiment including an air compressor 159a and a compressed air circuit 161a, an air pressure sensor 162a associated with the air circuit 161a is preferably included. The air pressure sensor 162a produces an electrical signal 163a that is a function of the air pressure in the air circuit 161a.

In a preferred embodiment, at least one hydraulic pressure sensor 162 is associated with the hydraulic circuit 161. The number of such pressure sensors will depend on the particular application and could involve many such sensors in some applications. The hydraulic pressure sensor 162 produces a pressure signal on an electrical connector 163 which is input to the electronic controller 15. In a preferred embodiment, the pressure sensors 162 are pressure switches that produce a signal when the hydraulic pressure in the hydraulic circuit 161 exceeds a certain level. However, there are other sensors or switches that provide a signal indicative of the power requirements of the PTO device 158 that could be used in other PTO configurations.

The PTO mode selector 70 preferably includes a two position toggle switch 75 that is biased to a first position. An operator can toggle the switch 75 to a second position, but when the operator releases the toggle switch 75 it returns to the first position. The toggle switch 75 produces a toggle switch signal when said switch is in the second position. The electronic controller 15 inputs the toggle switch signal over an electrical connector 76.

Although a preferred embodiment is described as including a toggle switch 75, other suitable switches can be readily and easily used without deviating from the spirit and scope of the present invention as defined by the appended claims. For example, one skilled in the art would recognize that a pressure switch, or other suitable momentary switch could be substituted for the toggle switch. In another embodiment, a cruise control on/off switch can be used as the PTO selection switch. Other examples could include a position switch that is engaged by some mechanical element that may include a lever or other operator activated mechanical actuator.

As is known in the art, the electronic controller 15 produces a fuel command that is delivered to the fuel delivery means 110. The fuel command determines the quantity of fuel that will be delivered to the individual engine cylinders and therefore, in part, determines the rotational velocity and power output of the engine. In a preferred embodiment, the fuel delivery means includes a plurality of electronically controlled fuel injectors (not shown). However, the present invention is not limited to engines having fuel injectors and includes other fuel delivery systems. In a preferred embodiment of the present invention, the electronic controller 15 issues a fuel delivery command over an electrical connector 111.

Referring now to FIG. 2, a preferred embodiment of the hydraulic sensor configuration used in connection with an embodiment of the present invention is shown. As shown in FIG. 2, the electronic controller 15 is connected with the PTO mode selector 70 which preferably includes a two position toggle switch 75. Also connected with the toggle switch 75 is an electrical ground 77 such that when the toggle switch 75 is moved to a closed position, the corresponding input on the electronic controller 15 is connected to ground 77. Similarly, a PTO input switch A 310 is connected between an input of the electronic controller 15 and ground 77. Each of the remaining PTO input switches, PTO input switch B 320, PTO input switch C 330, and PTO input switch D 340, are likewise connected between an input of the electronic controller 15 and ground 77. In a preferred embodiment of the present invention, each of the PTO input switches closes when the hydraulic pressure in the hydraulic circuit 161 reaches a certain level.

By selecting PTO input switches of varying hydraulic pressure levels, the PTO input switch A 310, will close at one hydraulic pressure level thereby grounding the corresponding input to the electronic controller, and the remaining PTO switches will close at different hydraulic pressures thereby causing the corresponding electronic input to the electronic controller to ground at those other hydraulic pressure levels. By matching these switch closures to a corresponding need for increased speed by the PTO device 158, the electronic controller 15 can sense the switch closure and the corresponding need for increased speed, and deliver a fuel delivery signal 111 to the fuel delivery means 110 to cause the engine power output to increase. In a preferred embodiment, the need for increased speed corresponds to an increase in the hydraulic pressure in the hydraulic circuit 161. However, in other embodiments, other sensors could be used to sense such needs. In a preferred embodiment, the increased engine speed also corresponds to an increased engine power. As is known to those skilled in the art, there is a direct relationship between engine speed and power. Thus, although a preferred embodiment uses the switch closures to sense a need for increased speed, some applications could use the switch closures to sense a requirement for increased power.

In a preferred embodiment, the desired engine speed, i.e. the engine speed command, produced by the electronic controller 15 while in PTO mode is a function of the outputs of the PTO input switches 310–340 as is shown and described fully below with respect to Table 1.

Referring now to FIG. 3, a flowchart of the software control implemented in a preferred embodiment of the present invention is disclosed. The software necessary to perform the functions detailed in the flowchart can be readily and easily written by one skilled in the art using the instruction set for the specific microprocessor or electronic controller used. A preferred embodiment of the present invention uses a Motorola 68336, although other suitable microprocessors can be readily and easily substituted without deviating from the spirit and scope of the present invention as defined by the appended claims.

Block 200 starts the software control implemented in a preferred embodiment of the invention. Program control passes to block 210. In block 210, the electronic controller 15 determines whether the engine 100 is operating in PTO MODE. Typically, the electronic controller 15 will verify that the engine is operating in PTO mode by determining whether certain signals are being received from specific switches and sensors on the engine or in the operator compartment. For example, in a preferred embodiment of the present invention, the electronic controller 15 determines that the engine is operating in PTO mode by verifying that a PTO mode selector 70 has been activated, the brake pedal is not pressed, the clutch pedal is not pressed, the vehicle is traveling below a certain predetermined speed, and the gear selector is in neutral. Although a preferred embodiment verifies the status of these described conditions, other applications could readily and easily verify the status of other operating conditions to enable the PTO mode. If, in block 210, the electronic controller 15 determines that the engine is not operating in PTO mode then program control passes to block 400 and returns to a main program. However, if the electronic controller 15 determines that the engine is operating in PTO mode then program control passes to block 230.

In block 230, the electronic controller 15 sets the engine speed command variable ENG_SPD_CMD equal to the value IDLE_SPD. In a preferred embodiment of the present invention, the idle speed is programmable value that is programmed into the electronic controller using an appropriate programming tool. Program control then passes to block 240.

In block 240, the electronic controller determines whether the PTO is operating in an automatic mode. If not in automatic mode, then program control passes to block 400. Typically, the electronic controller determines that an automatic mode is active by examining a particular flag in memory. The flag is set and the automatic mode is active, when the end user or other authorized person has previously programmed the automatic mode to be active when operating in PTO mode. Typically, that programming is done through the use of a service tool or other suitable programming device as is common in the art. If the PTO is operating in an automatic mode, then the engine speed command developed by the controller 15 will correspond to one of a user programmed array of engine speed commands SPD(1)–SPD(4) which, in the preferred embodiment, correspond to different engine speeds depending on the state of hydraulic pressure switches 310–340. For example, if the end user or other qualified operator desires the engine to run at five pre-determined speeds when in PTO mode with the automatic mode active, that user will program the electronic controller 15 with desired engine speed values corresponding to the various switch states, for example, those switch states shown below in Table 1.

TABLE 1

| ACTIVE PRESSURE SWITCHES | | | | |
|---|---|---|---|---|
| SWITCH A | SWITCH B | SWITCH C | SWITCH D | ENG_SPD_CMD |
| 1 | — | — | — | SPD(4) |
| 0 | 1 | — | — | SPD(3) |
| 0 | 0 | 1 | — | SPD(2) |
| 0 | 0 | 0 | 1 | SPD(1) |
| 0 | 0 | 0 | 0 | IDLE_SPD | where
1 = switch active;
0 = switch inactive;
and — = don't care.

As shown in Table 1, Switch A has priority over Switch B, which has priority over Switch C, which has priority over Switch D. The corresponding speeds SPD(1)–SPD(4) are preferably programmable by a qualified operator using a service tool. Program control passes from block 240 to block 250.

In block 250, the electronic controller 15 reads the pressure sensor signals of the respective hydraulic pressure sensors 162, which in a preferred embodiment are, PTO input switches A–D 310–340 shown in FIG. 2. In a preferred embodiment, the pressure sensors A–D comprise pressure switches 310–340 which move from an open position to a closed position when the hydraulic pressure exceeds a predetermined value. In block 250, the electronic controller 15 reads the pressure switch signals and in a preferred embodiment produces an engine speed command according to Table 1 as shown above. Those skilled in the art will recognize that the specific set of engine speed command values can be varied to meet the needs of the specific PTO configuration. Furthermore, other priorities can be established among the switches. Either of these modifications can be readily and easily made by those skilled in the art and such modifications would nevertheless fall within the scope of the present invention as defined by the appended claims. Program control then passes from block 250 to block 290.

In block 290, the variable engine speed command ENG__SPD__CMD is set to the value stored in the appropriate location in Table 1. In practice, these values will be stored in memory of the electronic controller 15 in a two dimensional array or some other equivalent data structure. Then, the engine controller issues an engine speed command corresponding to the variable ENG__SPD__CMD and causes the fuel delivery means 110 to deliver a prescribed calculated quantity of fuel according to the control. Program control then passes from block 290 to block 390.

In block 390, the electronic controller verifies that the engine continues to operate in PTO mode. If the engine is operating in PTO mode, then program control returns to block 240, otherwise program control passes to block 400 and returns to the main program.

As described above, a preferred embodiment of the present invention automatically varies the engine speed command in response to the PTO device requiring increased or decreased power requirements. In this manner, the operator does not have to continuously monitor the operation of the engine to prevent it from stalling or otherwise operating undesirably when the PTO device increases its power requirements.

What is claimed is:

1. An apparatus for controlling an internal combustion engine on a vehicle, said engine powering a drive shaft and a Power Take Off ("PTO"), said PTO driving a PTO device requiring multiple engine levels, said apparatus comprising in combination:
   an electronic controller;
   a sensor connected with said PTO device and producing a PTO signal responsive to engine speed required by said PTO device;
   an engine speed sensor electrically connected to said electronic engine controller and adapted to produce an engine speed signal;
   wherein said electronic controller includes a first programmed PTO speed and controls the engine speed to said first programmed PTO engine speed in response to said PTO signal;
   wherein said PTO device includes a hydraulic pump connected with a hydraulic circuit, said hydraulic pump connected with said PTO and creating a hydraulic pressure in said hydraulic circuit, said hydraulic pressure causing controllable motion of a hydraulic actuator;
   wherein said sensor includes a hydraulic pressure sensor associated with said hydraulic circuit, said pressure sensor producing a hydraulic pressure signal.

2. The apparatus according to claim 1 wherein said PTO device includes an air compressor in a compressed air circuit, wherein said air compressor is connected to said PTO.

3. The apparatus according to claim 2, wherein said sensor includes a clutch switch indicating engagement of said air compressor.

4. An apparatus for controlling an internal combustion engine on a vehicle, said engine powering a drive shaft and a Power Take Off ("PTO"), said PTO driving a PTO device requiring multiple engine levels, said apparatus comprising in combination:
   an electronic controller;
   a sensor connected with said PTO device and producing a PTO signal responsive to engine speed required by said PTO device;
   an engine speed sensor electrically connected to said electronic engine controller and adapted to produce an engine speed signal;
   said sensor includes a plurality of sensors each producing a PTO signal;
   wherein said electronic controller includes a plurality of programmed PTO speed and controls the engine speed as a function of one of said plurality of programmed engine speed in response to said PTO signals;
   wherein said PTO device includes a hydraulic pump connected with a hydraulic circuit, said hydraulic pump connected with said PTO and creating a hydraulic pressure in said hydraulic circuit, said hydraulic pressure causing controllable motion of a hydraulic actuator; and
   wherein said sensor includes a hydraulic pressure sensor associated with said hydraulic circuit, said pressure sensor producing a hydraulic pressure signal.

5. An apparatus for controlling an internal combustion engine on a vehicle, said engine powering a drive shaft and a Power Take Off ("PTO"), said PTO driving a PTO device requiring multiple engine levels, said apparatus comprising in combination:
   an electronic controller;
   a sensor connected with said PTO device and producing a PTO signal responsive to engine speed required by said PTO device;
   an engine speed sensor electrically connected to said electronic engine controller and adapted to produce an engine speed signal;
   said sensor includes a plurality of sensors each producing a PTO signal;
   wherein said electronic controller includes a plurality of programmed PTO speed and controls the engine speed as a function of one of said plurality of programmed engine speed in response to said PTO signals; and
   wherein said PTO device includes an air compressor in a compressed air circuit, wherein said air compressor is connected to said PTO.

6. The apparatus according to claim 5, wherein said sensor includes a clutch switch indicating engagement of said compressor.

* * * * *